Jan. 25, 1938.  J. TJAARDA  2,106,541
ENGINE MOUNTING
Filed April 9, 1934  2 Sheets-Sheet 2
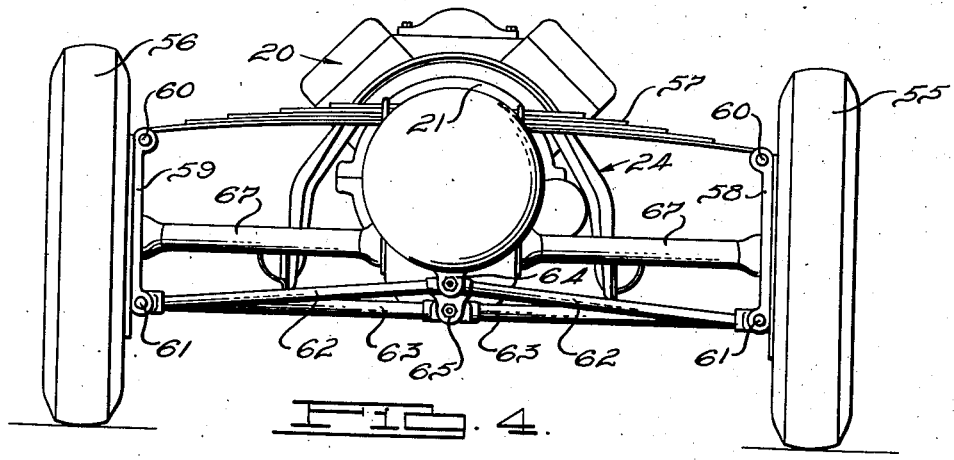
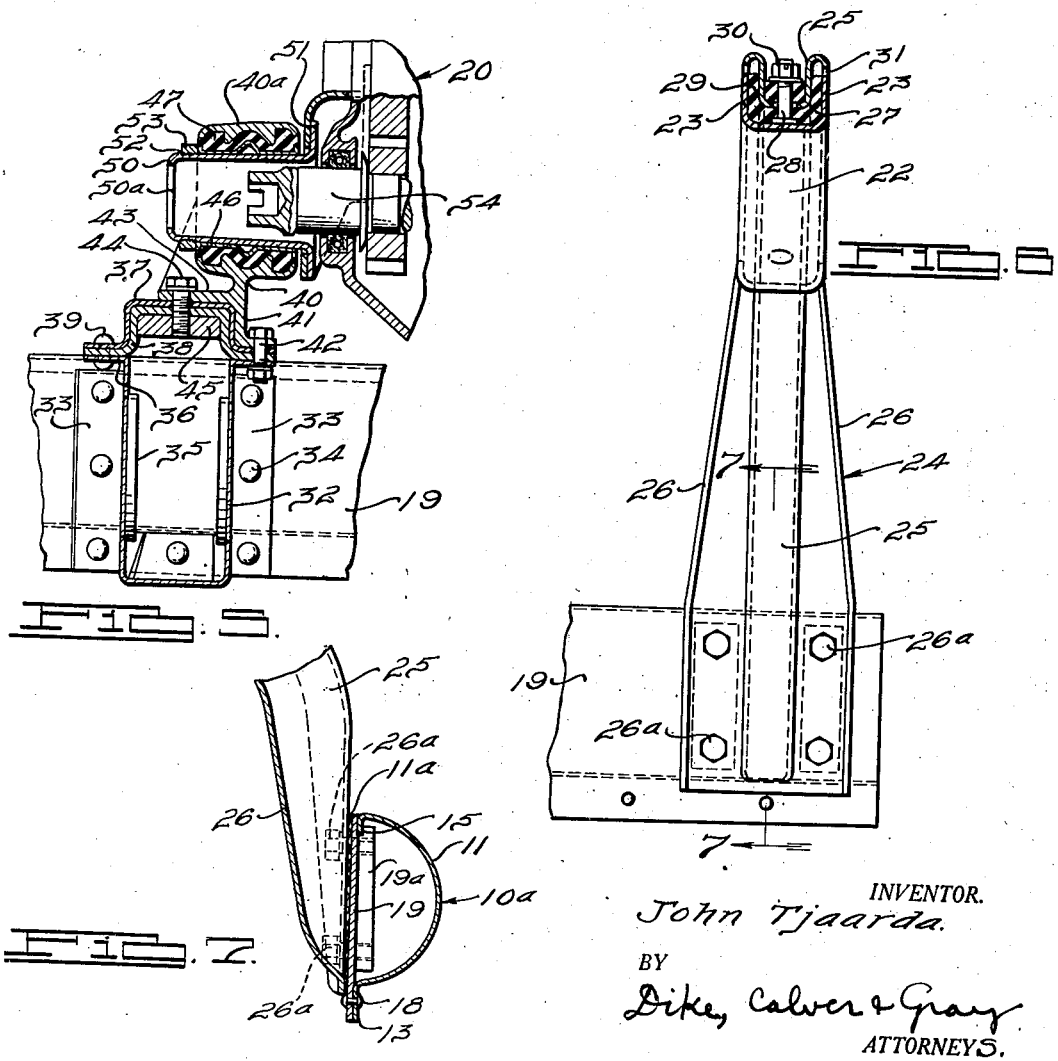
INVENTOR.
John Tjaarda.
BY
Dike, Calver & Gray
ATTORNEYS.

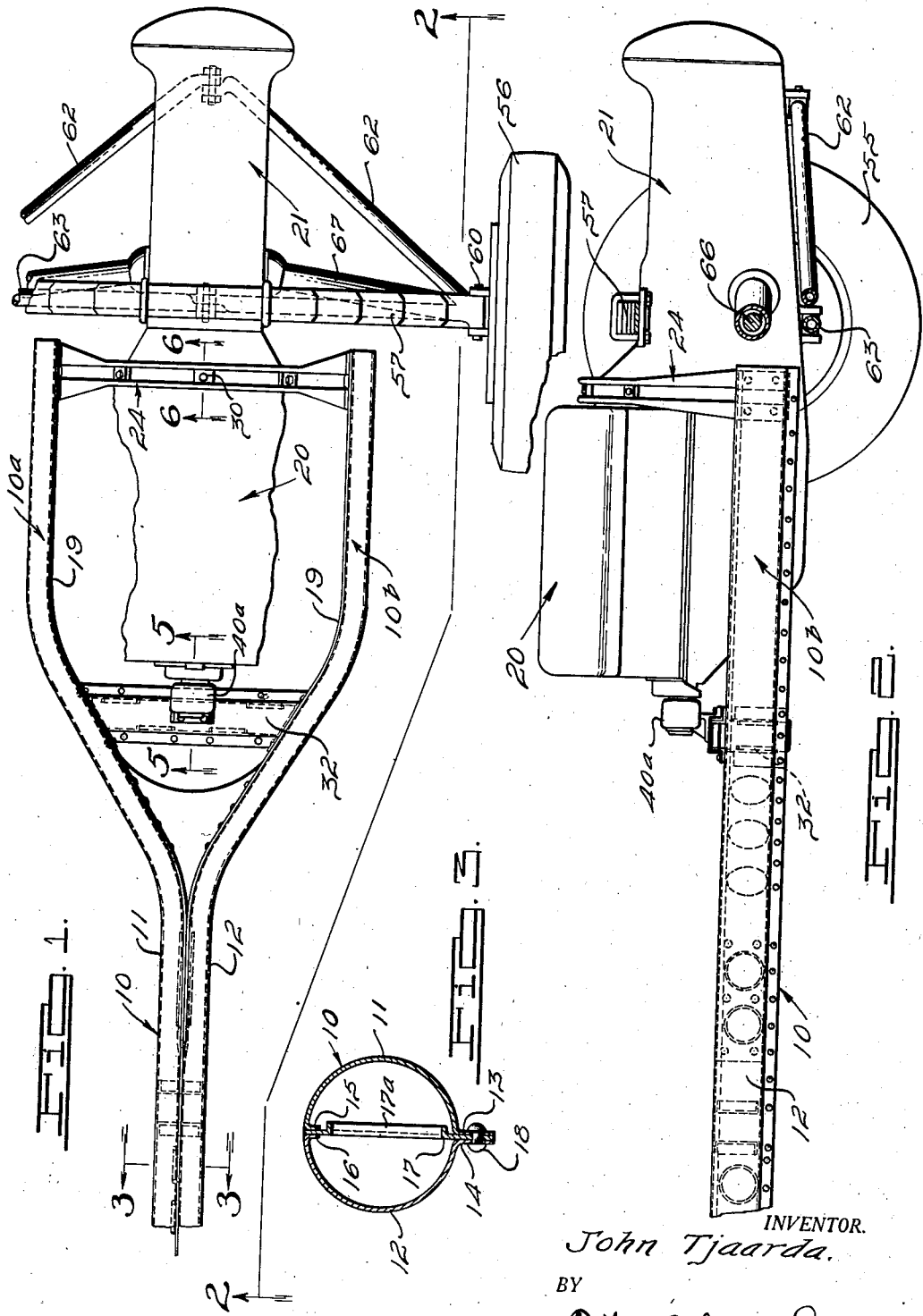

Patented Jan. 25, 1938

2,106,541

UNITED STATES PATENT OFFICE 2,106,541

ENGINE MOUNTING

John Tjaarda, Birmingham, Mich., assignor to Briggs Manufacturing Company, Detroit, Mich., a corporation of Michigan Application April 9, 1934, Serial No. 719,656

11 Claims. (Cl. 180—54)

The present invention relates to an engine mounting and vehicle frame construction adapted particularly but not exclusively for use in motor vehicle constructions wherein the engine is mounted adjacent the driving wheels of such vehicle.

An object of the present invention is to provide an engine mounting and vehicle frame construction particularly adapted for flexibly mounting an engine in the rear of a motor vehicle adjacent the driving wheels, the center of gravity thereof being preferably located forwardly of the rear driving axle shafts.

A further object is to provide an engine mounting and vehicle frame construction in which the rear of the body and frame is supported from the engine which in turn is supported on the rear driving wheels by spring means preferably effective to permit independent movement of the wheels while reducing to a minimum the unsprung weight of the vehicle.

A further object is to provide an engine mounting and vehicle frame construction in which the engine, transmission, differential and clutch are combined as a readily installed or removable power unit which yieldingly supports a portion of the body and frame of the vehicle and in which the power unit is floatingly supported in improved manner through yieldable connections by the driving wheels of the vehicle.

Another object is to provide an engine mounting and vehicle frame construction in which the weight of the power unit and body is so distributed as to effect an increased tractive efficiency of the driving wheels.

A further object of the invention is to provide an improved structure wherein the power unit or assembly, including engine, transmission, differential and clutch, is a separate unit spring supported directly on the driving wheels independently of the vehicle frame and which unit in turn forms a carrier for the frame and body. As a consequence, since the chassis frame does not, as in conventional practice, support the power mechanism, its structure may be materially reduced in weight and merely requires sufficient strength to sustain the body and passenger loads.

It is a further object to provide an improved engine mounting and vehicle frame construction in which the driving wheels are independently mounted for free vertical movement relative to each other.

It is a further object to provide an engine mounting and vehicle frame construction particularly adapted for mounting a power unit including an engine, transmission, clutch and differential in the rear of an aerodynamic streamlined vehicle body such as the "teardrop" type, while conserving the maximum carrying capacity in the interior of the body.

It is a further object to provide an engine mounting and vehicle frame construction in which vibrations from the engine, road shocks, and the like, are absorbed in vibration absorbing media such as live rubber, springs, or the like, and are not substantially transmitted to the vehicle body.

Other objects of this invention will appear in the following description and appended claims, reference being had to the accompanying drawings forming a part of this specification wherein like reference characters designate corresponding parts in the several views.

Fig. 1 is a fragmentary top plan view showing the rear of a vehicle body frame in which a power unit is mounted in accordance with the present invention.

Fig. 2 is a fragmentary elevation partially in section, taken through line 2—2 of Fig. 1 in the direction of the arrows.

Fig. 3 is a sectional view taken on the line 3—3 of Fig. 1 in the direction of the arrows.

Fig. 4 is a rear elevation showing the power unit mounted on the driving wheels of the vehicle.

Fig. 5 is a fragmentary section of the front engine mounting taken on line 5—5 of Fig. 1 in the direction of the arrows.

Fig. 6 is a fragmentary sectional view taken on the line 6—6 of Fig. 1 in the direction of the arrows.

Fig. 7 is a sectional view taken on the line 7—7 of Fig. 6 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings and particularly to Fig. 1, 10 designates a tubular central frame member extending longitudinally of the vehicle body and forming a part of the body carcass. The frame member 10 has forks 10a and 10b extending outwardly from the rear portion thereof to provide a "wishbone" type of frame in which sufficient clearance is provided between the forks 10a and 10b to accommodate the forward end of a power unit 20. As shown in Fig. 3, the tubular frame member 10 is formed of two semi-circular tubular members 11 and 12 having depending flanges 13 and 14 and inwardly depending top flanges or lugs 15 and 16. A central reinforcing member or plate 17 extends lengthwise of the member 10 and is secured by welding or similar means to the lugs 15 and 16 along its top longitudinal edge and is secured between the flanges 13 and 14 along its lower longitudinal edge as by means of rivets 18. The central member 17 is provided with a plurality of flanged openings 17a for the purpose of eliminating weight from the member without sacrificing structural strength thereof. This construction is such that the members 11 and 12 and the member 17 form the main unitary tubular frame member 10. The forks 10a and 10b are formed from the members 11 and 12 respectively, the open side faces of which are closed by longitudinal plates 19 secured thereto in the manner shown in section in Fig. 7. A cross brace 32 is secured to the plates 19 and the forks 10a and 10b and acts as a brace for the framework while supporting the forward end of the power unit 20.

At the rear end of the forks 10a and 10b a frame supporting bracket 24 is provided such as shown in Fig. 6. The bracket 24 acts as a suspension arch and is connected with a plate 22 adapted to rest upon the top of the casing 21 forming a part of the power unit designated generally as 20. The power unit consists of an engine, clutch, transmission, and differential, all mounted on or in the unitary casing 21.

The member 22 is formed with a substantially enclosed channel which is generally U-shaped in cross section and provided with upwardly extending substantially parallel side flanges 23. A body of rubber 27 is placed within the channel and maintained between the flanges 23. The supporting bracket 24 is formed with a channel 25 extending throughout its length. At the top portion of the bracket 24 the channel 25 rests in a groove in the rubber 27 and is maintained therein in such a manner that a space 31 is provided between the edges of the channel 25 and upper edges of the flanges 23. This space 31 prevents a direct metal-to-metal contact between the member 22 and the bracket 24 when in the assembled position. The bracket 24 and the member 22 are maintained in their relative positions as by means of bolts 28 which are embedded in the body of rubber 27 and extend upwardly therefrom through openings provided in the channel 25. A body of rubber 29 is then placed inside the channel 25 and the bolts 28 extend through this body of rubber 29. Nuts 30 are screw threaded on the bolts 28 and through intervening washers engaging the rubber 29 compress the parts together in cushioned relation.

Reenforcing flanges 26 extend along each longitudinal edge of the channel 25 and serve to impart rigidity and strength to the support. The lower ends of the flanges 26 are secured to the plates 19 by means of bolts, rivets, or the like 26a. The detail of this fastening is shown in Fig. 7. As there shown plates 19a are welded within the frame forming member 11 and are tapped to receive the screw-threaded ends of the bolts 26a. An anti-squeak strip 11a is preferably interposed between the face of the end of the bracket 24 and the face of the closing plate 19.

The forward end of the power unit 20 is supported on the cross brace 32 and is held in a vibration absorbing cushioned mounting shown in detail in Fig. 5. As there shown, the brace 32 is a channel member generally U-shaped in cross section and provided with the flanges 33 at its ends which are secured as by riveting to the plates 19 secured to the channel members 11 and 12 forming the forks 10a and 10b respectively.

In order to provide a brace which is light in weight without sacrificing its strength, flanged openings 35 are provided in the longitudinal sides thereof. The top longitudinal edges of the channel member are turned substantially at right angles to the sides thereof to form the flanges 36. A top reenforcing member 37 and a supporting member 38 are secured by rivets or the like 39 to the flanges 36. Secured to the reenforcing member 37 and the supporting member 38 is a bracket 40 having a downwardly extending flange 41 which is secured to the reenforcing member 37, the supporting member 38, and the flange 36 by means of bolts or similar fastening means 42. Extending laterally and at substantially right angles to the flange 41 on the bracket 40 is a flange 43 which is secured to the parts 37 and 38 by means of bolts or similar fastening means 44, which may extend through the supporting member and reenforcing member and have a screw-threaded connection with a filler block 45 located inside the channel of member 38.

The supporting bracket 40 at its upper end is provided with an annular hub 40a in which an annular sleeve 46 is carried. The annular sleeve 46 has a body of rubber 47 bonded thereon and fitted between a face of the annular sleeve 46 and the inner corrugated face of the hub 40a. The forward end of the power unit 20 is provided with an extending supporting hollow bearing member 50. This member is tapered in its length and is secured to the power unit 20 at 51 by welding or rivets. The member 50 extends forwardly from the power unit and within and in engagement with the tapered annular sleeve 46. An end of the supporting bearing 50 extends laterally beyond the end of the annular sleeve 46 and is provided with a screw-threaded portion 52 on which a nut 53 is placed. By drawing up the nut 53 on the member 50 the latter will be drawn rearwardly sufficiently to clamp its wedge shaped surface in binding engagement with the inner wedge-shaped surface of sleeve 46. An annular flanged opening 50a is provided in the end of the bearing member 50 and permits the insertion of a crank therethrough, when necessary, to connect with the shaft 54 for manually starting the engine.

In Fig. 4 is shown the assembly of the power unit 20 and the driving wheels 55 and 56. The casing 21 of the power unit 20 is secured to the mid-portion of a transverse leaf spring assembly 57 and is suspended therefrom. The wheels 55 and 56 are mounted on brake backing plates 58 and 59, which are maintained in upright position through pivotal connections 60 with the ends of the transverse spring 57 and pivotal connections 61 with the torque arms 62 and 63. The torque arms 62 and 63 are pivotally secured to longitudinally spaced lugs 64 and 65 which depend from the bottom of the casing 21. The wheels 55 and 56 are driven from the differential gear mechanism through live axle shafts 66 (Fig. 2) which are universally connected to the differential mechanism and wheels in customary manner to provide a "full floating" wheel mounting. The axle shafts extend through tubular axle housing sections 67 which are trunnioned at their ends to permit vertical movements of the wheels. The construction, therefore, is such that the wheels 55 and 56 are independently sprung and are free to move relative to each other in a vertical direction. The torque arms 62 and 63, transverse spring 57, and torque tubes 67 cooperate at all times to maintain the wheels 55 and 56 in proper transverse relation.

From the foregoing it will be seen that the power mechanism comprising the engine, differential mechanism, transmission mechanism and clutch mechanism, preferably arranged in this order, constitutes a single unit adapted to be readily installed or removed as such. The frame is bifurcated at its rear end to embrace or straddle the forward end of the power unit and is hung thereon. Preferably the power unit has its center of gravity slightly in advance of the bracket 24. The center of gravity of the power unit 20 will thus be located in advance of the spring 57 and the transverse wheel axis. This construction has the advantage of insuring proper traction at all times and better stability. Inasmuch as rapid acceleration sets up forces tending to lift the forward end of the power unit and depress the rear end whereby full traction would ordinarily be lost, the present arrangement of the engine is desirable in order to counteract these forces.

It is important to note that the forward connection at 40a between the power unit and frame lies on the longitudinal axis of the engine crankshaft, and that the arched supporting connection 22—24 has a curvature whose center lies substantially at the axis of the crankshaft. Since these connections between the power unit are made through rubber it will be seen that the oscillatory or vibratory movement of the power unit about the axis of the crankshaft will be readily absorbed and will not be transmitted in any substantial extent to the frame and body, the torque reaction being largely taken up by the spring 57. It will also be observed that the center of gravity of the engine or power unit mass is materially below the point of suspension of the unit from the spring 57 which point is substantially on a line normal to the crankshaft axis. By virtue of this construction, when the car is travelling in a curvilinear path, the engine mass, due to its pendulum effect, tends to become displaced in the direction of the outside of the curve. The effect of this is to exert forces through the spring leaves effective to produce angular or banking movement of the wheels. Due, therefore, to the arrangement and manner of supporting the engine on the wheels, centrifugal forces set up when the car goes into a curve are effectually counterbalanced by augmented centripetal forces, thereby giving the car increased stability on curves.

I claim:

1. A motor vehicle having a frame and a propulsion unit adjacent the rear end thereof, said propulsion unit supporting the rear portion of said frame and comprising a unitary casing containing an engine and transmission mechanism, said casing having a forwardly extending bearing, a resilient engine mounting secured to the vehicle frame adjacent the forward end of said casing and adapted to receive said bearing, suspension means connecting the frame and casing intermediate the ends of said casing, and spring means supported directly by the driving wheels of the vehicle and directly connected with said casing rearwardly of said suspension means.

2. In a motor vehicle having a central longitudinal frame bifurcated at its rear end, a power unit, a cushion support secured to the vehicle frame adjacent the forward end of the power unit and yieldably connected to the latter, a vibration absorbing bearing plate carried by said power unit in rear of said support, a suspension member secured at its ends to the bifurcated ends of the vehicle frame and secured to and yieldingly supported by said bearing plate at a point intermediate said ends, a transverse leaf spring having its ends supported directly by the driving wheels of the vehicle and having the midsection thereof secured to said power unit to suspend said unit therefrom, the weight of the power unit and connected portions of the vehicle frame being so distributed that the center of gravity thereof is located at a point forward of said spring.

3. In a motor vehicle having a frame and rear driving wheels, a power unit, a cushion support secured to the frame adjacent the forward end of the power unit and comprising a bracket providing an annular ring having its axis on a line extending substantially axially of the power unit, a body of compressible rubber within said ring, a forwardly projecting bearing member secured to said power unit and extending into and engaging said body of rubber, a vibration absorbing bearing plate carried by said power unit in rear of said support, a suspension member secured at its ends to the vehicle frame and secured to and yieldingly supported by said bearing plate at a point intermediate said ends, a transverse leaf spring having its ends supported directly by the driving wheels and having the mid-section thereof secured to said power unit to suspend said unit therefrom, the weight of the power unit and connected portions of the vehicle frame being so distributed that the center of gravity thereof is located at a point forward of the transverse axis of the driving wheels.

4. In a motor vehicle having a frame and rear driving wheels, a power unit extending between said wheels and supported thereon, a yoke-like suspension member having the ends thereof secured to the frame and having its mid-section arched to embrace said power unit and suspend said frame from the power unit, and separate means spaced from said suspension member for mounting the frame on said power unit.

5. A motor vehicle comprising a frame and wheels, a power unit including an engine having a horizontal crank shaft extending longitudinally of the vehicle, spring means connected to the wheels and connected centrally to the power unit for suspending the power unit therefrom, and longitudinally spaced supporting connections between the frame and engine, each connection being centered on the crank shaft axis, one thereof lying above said axis and the other substantially on said axis.

6. A mounting for a rear engine in a motor vehicle, including a frame having a tubular center member terminating in a bifurcated end portion having outwardly extending portions forming an engine cradle, a floating connection secured to the frame at a point adjacent the forward end of an engine mounted therein, a suspension member having its ends secured to the bifurcated frame portion and extending above such cradle and overlying the engine, a yielding connection between the engine and the suspension member, and a transverse leaf spring carried by the driving wheels and overlying and secured to the engine.

7. A weight distributing mounting for a rear engine in a motor vehicle adapted to increase the tractive efficiency of the driving wheels and comprising an engine cradle formed integrally with the rear end of the vehicle frame, a cushioning connection between the frame and engine at a point adjacent the forward end of the engine, and a suspension member having its ends secured adjacent the ends of the engine cradle portion and extending upwardly thereof to overlie the engine, a yielding connection between the engine and the suspension member, and a transverse leaf spring carried by the driving wheels and overlying and secured to the engine.

8. In a motor vehicle having rear driving wheels, a power unit, a central longitudinal frame member bifurcated at its rear end to embrace said unit and terminating short of the transverse wheel axis, said member being resiliently connected to and suspended from the power unit at a point in rear of its center of gravity, said frame also having a resilient point of connection with said unit in advance of the center of gravity, and spring means in rear of such point of suspension for supporting the power unit and frame member on the wheels, said spring means comprising a transverse leaf spring located in rear of the center of gravity of said unit.

9. In a motor vehicle having rear driving wheels, a propulsion unit adjacent the rear end of the vehicle and disposed intermediate the driving wheels thereof, said unit having its center of gravity at a point forward of the transverse axis of said driving wheels, a transverse leaf spring for supporting said unit on the driving wheels and located in rear of said center of gravity, and a chassis frame supported on said wheels only through the medium of said unit, said frame being resiliently connected to said unit at spaced points located in rear of the center of gravity of the unit and in advance thereof.

10. In a motor vehicle having a frame and rear driving wheels, a propulsion unit disposed intermediate the driving wheels and having its center of gravity at a point forward of the transverse axis of said wheels, said propulsion unit comprising engine, clutch, transmission and differential mechanism and a unitary casing for housing the same, said unit having a forwardly extending bearing, a resilient engine mounting secured to the vehicle frame adjacent the forward end of said propulsion unit and adapted to receive the said bearing, a bracket mounted on said casing intermediate its ends and connected to the rear portion of said frame for supporting the frame, and spring means connected to the driving wheels of the vehicle and directly connected with said propulsion unit.

11. In a motor vehicle having a frame and rear driving wheels, a propulsion unit disposed intermediate the driving wheels and having its center of gravity at a point forward of the transverse axis of said wheels, said propulsion unit comprising engine, clutch, transmission and differential mechanism and a unitary casing for housing the same, said unit having a forwardly extending bearing, a resilient engine mounting secured to the vehicle frame adjacent the forward end of said propulsion unit and adapted to receive the said bearing, a bracket mounted on said casing intermediate its ends and connected to the rear portion of said frame for supporting the frame, and spring means connected to the driving wheels of the vehicle and directly connected with said propulsion unit in rear of said center of gravity.

JOHN TJAARDA.